United States Patent [19]
Bohn et al.

[11] Patent Number: 5,766,406
[45] Date of Patent: Jun. 16, 1998

[54] APPARATUS FOR WORKING LAYER MATERIAL

[75] Inventors: Martin Bohn, Reutlingen; Wolfgang Scheller, Oberpleichfeld; Klaus Hoerz, Neuffen, all of Germany

[73] Assignee: Bielomatik Leuze GmbH & Co., Germany

[21] Appl. No.: 498,296

[22] Filed: Jul. 3, 1995

[30] Foreign Application Priority Data

Jul. 12, 1994 [DE] Germany ............. 44 24 429.0

[51] Int. Cl.[6] ................................................. B23B 35/00
[52] U.S. Cl. .................. 156/362; 156/517; 156/521; 156/556
[58] Field of Search ............................. 156/516, 517, 156/521, 556, DIG. 2, DIG. 20, 362

[56] References Cited

U.S. PATENT DOCUMENTS

| | | |
|---|---|---|
| 2,291,841 | 8/1942 | Staude. |
| 3,311,032 | 3/1967 | Lucas. |
| 3,745,893 | 7/1973 | Helm. |
| 3,751,324 | 8/1973 | Enskat. |
| 3,835,756 | 9/1974 | Bosse. |
| 3,946,629 | 3/1976 | Achelpohl. |
| 4,003,780 | 1/1977 | Cohn. |
| 4,061,527 | 12/1977 | Traise. |
| 4,285,747 | 8/1981 | Rega. |
| 4,526,654 | 7/1985 | Malthouse. |
| 4,549,454 | 10/1985 | Yamashita. |
| 4,608,115 | 8/1986 | Schroth et al.. |
| 4,642,150 | 2/1987 | Stemmler. |
| 4,701,239 | 10/1987 | Craig. |
| 4,838,982 | 6/1989 | Klaeser et al.. |
| 5,021,111 | 6/1991 | Swenson. |
| 5,051,147 | 9/1991 | Anger. |
| 5,102,485 | 4/1992 | Keeler et al.. |
| 5,235,515 | 8/1993 | Ungplyakul et al.. |
| 5,261,996 | 11/1993 | Rossini. |
| 5,344,519 | 9/1994 | Galchefski. |
| 5,380,381 | 1/1995 | Otruba. |
| 5,413,651 | 5/1995 | Otruba. |
| 5,415,716 | 5/1995 | Kendall. |
| 5,429,576 | 7/1995 | Doderer-Winkler. |
| 5,458,729 | 10/1995 | Galchefski. |

FOREIGN PATENT DOCUMENTS

| | | |
|---|---|---|
| 219114 | 4/1987 | European Pat. Off.. |
| 355292 | 2/1990 | European Pat. Off.. |
| 358382 | 3/1990 | European Pat. Off.. |
| 496582 | 7/1992 | European Pat. Off.. |
| 554911 | 8/1993 | European Pat. Off.. |
| 969370 | 5/1958 | Germany. |
| 2853033 | 6/1980 | Germany. |
| 3736598 | 5/1989 | Germany. |
| 8817009 | 7/1991 | Germany. |
| 642594 | 12/1978 | Switzerland. |

*Primary Examiner*—Jenna Davis
*Attorney, Agent, or Firm*—Quarles & Brady

[57] ABSTRACT

An apparatus for applying dispensing parts to a support web has a transfer device running synchronously with the web for applying the dispensing parts, a positioning device for the correct position separation and transfer of the dispensing parts to the transfer device and a feed device for supplying a dispensing web to the positioning device. The three devices are independently controllable with respect to their working speeds, so that by speed superimposing any random number of dispensing parts of random size and in random positions can be transferred to the support web.

30 Claims, 4 Drawing Sheets

APPARATUS FOR WORKING LAYER MATERIAL

BACKGROUND OF THE INVENTION

The invention relates to an apparatus for working layer material, particularly for applying one or more layer parts to one or more support parts formed from flat material, such as paper-like material. The particular layer or support part can be formed by a continuous material web or individual portions, such as sheet layers and in the running direction or transversely thereto can be larger than the other part. The two parts are appropriately interconnected adhesively or in shear-resistant manner, e.g. by an adhesive layer and as a rule the support part projects on all sides over the layer part or is terminated in edge-flush manner therewith.

Layer parts can e.g. be labels or other marks. They can be supplied in endless manner from a roll storage means or can be transferred as prepunched labels to the support part. Both the waste grating surrounding the labels and also a support web initially carrying the layer parts, i.e. those parts which are not transferred to the support part, are removed and disposed of upstream thereof by deflecting away.

If the support part is an endless web, then following the application of the layer parts it is separated by longitudinal and/or transverse cuts into individual sheet layers of the same or different format, the cutting lines being predetermined during the application of the layer parts and therefore define format edges. With respect to the same one or more layer parts are successively and/or in juxtaposed manner applied in correct position to each format field. Not only identical format fields succeeding in the running direction are to be provided with successive layer parts of the same size in the running direction and with the same or different positioning. There is also a need to provide successive format fields with layer parts of different size in the running direction, with differently positioned layer parts in the running direction and/or with several layer parts, which between individual format fields can be of different sizes and have different positions and it is also desirable to leave individual format fields free from layer parts.

OBJECTS OF THE INVENTION

An object of the invention is to provide an apparatus avoiding the disadvantages of known constructions and in which it is in particular possible to apply layer parts according to one to all of the above criteria and preferably very little retooling is required for conversion purposes.

SUMMARY OF THE INVENTION

According to the invention the apparatus has a feed for the particularly layer part, a transfer device for transferring the layer part to the support part and between them a positioning device for taking over the layer part from the feed and for the positionally correct delivery of the layer part to the transfer device, the feed, the positioning device and/or the transfer device being drivable in the working operation of the apparatus with continuously variable transmission ratio with respect to the movement speed of the layer part. By dynamic changes to the transmission ratio between the feed and the positioning device the latter can take up alternately or in some other way layer parts of different length, namely one or several successive parts for each format field. By dynamically changing the transmission ratio between the positioning and transfer devices, the transfer device can deliver to the support part the layer part or parts with different reciprocal spacings or different positionings between the individual format fields and can adhesively fix same with respect thereto.

For determining the positioning is provided an outer edge of the layer part directed transversely to the running direction and in particular its rear outer edge. As a result of this operating procedure it is also possible in the running direction to provide following format fields with different numbers of successive layer parts or to exclude format fields located between adjacent format fields from the application of a layer part. The length of the layer parts to be measured in the running direction can be continuously varied between approximately 10 and 330 mm or more. e.g by separating from a layer web using a transverse cutting device, which is then, as will be described relative to the positioning device, is drivable or is formed by the latter.

The feed, the separating or cutting device, the positioning device and/or the transfer device can in each case be driven by a separate motor, which is driven in computer-controlled manner during operation with different rotational speeds. It is in particular possible to use for this purpose a vector-regulated asynchronous motor, which directly drives, without an intermediate gear, a rotor of the particular device, so that for each revolution the rotor can be moved with the different speeds.

The transfer device or its transfer rotor is appropriately driven with a control and drive unit which, like the aforementioned motors, permits a dynamic speed or rotation position-regulatable drive. It can e g. be a gear arrangement, which is driven by means of a vertical or main shaft with a substantially constant speed and whose driven end is controllable in the indicated manner for the transfer device. A transfer rotor of the transfer device appropriately runs synchronously with or slip-free to the carrier part, the feed and the positioning device being independently controllable at all times with respect to said speed.

The said drive of the rotor, particularly the transfer rotor, appropriately takes place in accordance with U.S. patent application Ser. No. 08/399,840 by means of the control and drive unit located on a base frame. The apparatus is also constructed and arranged according to the working unit described therein, so that reference is made to the earlier-dated application for incorporation into the present invention.

The number of successive layer parts per format field can be selected by the freely variable transmission ratio between the knife and support part speed. The positioning of the layer part is preselected by means of the knife position prior to cutting. The layer web is conveyed through by the feed freely between the knife rotor and the counterrotor or transfer rotor and is placed on the latter by means of suction holes. For as long as the layer part has not been separated, the suction or transfer cylinder can slide freely relative to the layer web, so that prior to the transverse separation or cutting there is a slip without material damage, but after transverse cutting the layer part is held in position-stable manner on the suction cylinder, i.e. there is then no further slip.

If, after the taking over of the layer part by the transfer rotor or following the transverse separation, there is a slight slip, the latter can be compensated in that the permanent rotation position superimposing by a superimposing gear having a rotation position register motor is correspondingly adjusted.

In order to permit a low-inertia acceleration or deceleration by the particular drive, the driven or moved parts of the corresponding devices, particularly the feed or positioning device are to be made as low-mass or weight as possible. This can be achieved by materials which have a much lower specific gravity than steel or have at least the same bending strength and/or in that the core of the particular part is in the form of a hollow chamber profile with several, in particular separated hollow spaces or chambers. The material is with particular advantage glass fibre-reinforced plastic and the hollow spaces are in particular longitudinal channels or longitudinal channels distributed over the cross-section and whose arrangement and distribution can also be used for the running balance of the working rotor.

By a pressure mark regulation, namely a control by means of marks on the layer part or the support part, said two parts can be brought together in a very positionally accurate manner. For detecting the marks corresponding sensors are provided, whose signals are used for controlling the said speeds. By means of the inventive drive concept with vector-regulated asynchronous motor, whose rotary position is in each case determined and used for control purposes, a dynamic control or regulation of each of the said devices is possible independently of the others. Therefore the length of the particular layer part, the number thereof and the positioning per format field can be randomly selected within given limits. In addition, only selected format fields may be provided with a layer part. So that the layer web only opposes with a minimum inertia accelerations by the feed, it is guided in rolled and freely hanging manner prior to entering the feed, e g. by means of a low-mass system of compensating rolls.

The part of the apparatus carrying the aforementioned devices is appropriately constructed as a preassembly, ready to operate subassembly, which is engageable or disengageable with respect to a base frame transversely to the material running direction or roughly parallel to the material plane, can be fixed with respect to the base frame in said transverse direction and can be adjusted about a vertical axis and with respect to the base frame by bracing. The subassembly has a coupling-like connecting member for the non-destructive, easily detachable connection to the base frame, which carries the entire weight of the working unit.

Electric control lines for the drives, fluid control lines for the fluid drives and the gear connection to the superimposing gear can also be easily detached in non-destructive manner. The working unit is appropriately a part of a production line with further working units located on the base frame and through which can successively pass the carrier web. For these working units is provided a common, computer-assisted control device, which operates in the manner of a collision network and has a main unit, a guide unit and a manually operable control for the particular working unit. Each of these three units contains a memory programmable control, the units being interconnected in series or in closed cycle in the manner of a control bus. The working units can be mutually interchanged, because each storage programmable control contains the same program. All the information of all the controls contained in the data bus are constantly available to all the controls, which in turn feed into the data bus all the detected changes of state, e.g. the rotation positions of said drives.

BRIEF FIGURE DESCRIPTION

These and further features can be gathered from the claims, description and drawings and the individual features, both singly or in the form of subcombinations, can be implemented in an embodiment of the invention and in other fields and can represent advantageous, independently protectable constructions for which protection is hereby claimed. Embodiments of the invention are described in greater detail hereinafter relative to the drawings, wherein show:

FIG. 1 An apparatus according to the invention in cross-section parallel to the material running direction.

FIG. 2 A detail of FIG. 1 on a larger scale.

FIG. 3 The working rotor of the apparatus in a part sectional radial view and in a rolled out representation.

FIG. 4 A detail of another embodiment.

DETAILED DESCRIPTION OF PREFERRED EXAMPLE EMBODIMENTS

The apparatus essentially comprises an upper working unit 2 and a lower machine part or base frame 3 for several successive working units. In the bottom area the working unit 2 has a frame-like base 4 roughly connected to its ground plan and which has a frame opening, whose width is at least as large as the material width to be processed. On the remote frame edges of the base 4 there are two plate-like side walls 5 located outside the working width, which are interconnected in dimensionally rigid manner by further crossmembers 6 in addition to the base 4. The frame 3 has two corresponding plate-like side walls 7 located roughly in the planes of the side walls 5 on either side of the working width and said plates 7 have on the top so as to constitute crossmembers rod or rail-like supports 8, which support the unit 2 with the crossparts of the base 4 and can be fixed by bracing against the rail-like contact surfaces of the supports 8. Roll-like rotors 9 project over the underside of the base 4 and with them it is possible for the unit 2 to be moved linearly on the rails 8 and on any random setting down surface and which in the case of the braced unit 2 are located in unsupported manner in depressions of the rail contact surfaces.

The support part 10 or the paper or similar support web to be processed is introduced roughly horizontally in the running direction 12 on one side between the side walls 5 and is passed out again on the other side and between the same is tensioned and runs approximately linearly or in a horizontal plane without any significant deflection. The paper or similar layer web 11 for forming dispensing or layer parts 11' is supplied in roughly the opposite running direction 13 sloping downwards against the support web 10 from the outlet side, runs directly above the support web 10 already provided with the layer parts 11' and parallel thereto without interposed separating means between the side walls 5, is then deflected in approximately S-shaped opposing manner and from there upwards and again counter to the running direction 12, after which the layer parts are deflected by more than 180° and less than 225° downwards and therefore in the running direction 12, so that with the same speed as the support web 10 they are transferred in rolling manner to the latter and then leave the unit 2 under the supplied portion of the layer web 11 in the running direction 12.

The transfer of the layer parts 11' to the support web 10 takes place through a transfer device 14, which in turn takes over the layer parts 11' above the support web 10 from a positioning or transverse cutting device 15. The latter is supplied with the layer web 11 by feed means 16 with the said deflections. All the moving parts of the means f14 to 16 are directly or indirectly mounted on the side walls 5 and the areas of said means guiding the webs extend over at least the working width or web width of the support web 10 slightly smaller than the internal spacing between the side walls 5.

The device 14 has a transfer rotor 17 touching the movement path of the carrier web 10 in the vicinity of the lowest point of its through cylindrical outer circumference and a counter-rotor 18, which in diameter is roughly ⅙ smaller, which also touches said path from below and with the highest point of its also through cylindrical circumference. Between the two rotors 17, 18 is formed a width-continuously adjustable passage gap, whose narrowest point forms the setting down point 20, at which the layer part 11' is progressively transferred by rolling counter to the running direction 12 on the top of the support web 10.

The device 15 has a smaller external diameter positioning rotor 21, which is only half as large as the rotor 17 and whose cylindrical outer circumference extending over most of it forms with the top of the rotor 17 a width-continuously adjustable passage gap for the layer parts 11, 11'. This passage gap is slightly displaced in the running direction 12 with respect to the passage gap 20. The positioning rotor 21 is provided as a knife roller with a ledge-like shearing or cutting knife 22 projecting over its outer circumference and which passes uninterruptedly over the working width of the layer web 11 and so cooperates with a counterknife 23 rigid with respect to the frame 5, 6 that it cuts running in the running direction of the layer web 11. The cutting point is on the side of the passage gap remote from the running direction 12 immediately adjacent thereto or between the circumferences of the rotors 17, 21.

The narrowest point of the passage gap forms the transfer point 24, at which the layer parts 11, 11' are transferred in rolling manner from the circumference of the rotor 21 to the circumference of the rotor 17 in a gradual manner over the length therof, the distance between the transfer point 24 and the cutting point in the running direction of the rotors 17, 21 and related to the axes of these rotors is at the most 15° to 30°. Corresponding to this distance in the rotation or running direction upstream of the cutting edge of the knife 22 and on the circumference of the rotor 21 is provided a bead-like protuberance, which extends round the axis of the rotor 21 over an arc angle of approximately 45°, has an apex curved in convex manner and extends over the working width. When this projection passes the circumference of the rotor 17 the passage gap has its smallest width, so that the layer part 11' is reliably pressed against the rotor 17, whilst otherwise the passage gap is wider only by the web height of approximately 2 to 3 mm, so that the layer web can be moved in unhindered, damage-free manner through the gap and with respect to the circumferences of the rotors 17, 21. At the instant of cross-cutting the bead secures the end of the layer web 11 upstream of the cutting point in the running direction by means of a slight clamping action and under the tension of the layer web 11, because the knives 22, 23 perform the cut when the apex of the bead is in its position of greatest proximity to the circumference of the rotor 17.

The feed 16 provided in the running direction 12 after the rotors 17, 18, 21 of the devices 14, 15 has, directly above the support web 10, a feed rotor 25 constructed as a roller and from which the layer web 11 is guided on the side remote from the devices 14, 15 in the upwards direction to a further, slightly larger diameter feed rotor 26. The rotors 25, 26 are driven by means of an intermediate drive with the same rotation direction and through the slightly larger circumferential speed of the rotor 6, the layer web 11 held with slip with respect to the latter is kept under tension between the two rotors 25, 26. The rotor 26 round which passes the layer web 11 over approximately 90° or less than 180° forms a component of a further feed rotor 27, namely a plurality of juxtaposed, endless belts, which are guided in slots of the rotor 26 and on the circumference of a smaller diameter deflecting means 28, which is directly adjacent to the back of the support of the counterknife 23. The belts 27 held on the lowest strand resiliently under tension by a tensioning device form with their upper strand between the two deflecting means 26, 28 an approximately linear path for the layer web 11. In the vicinity of this path and part 30 of the outer circumference of the rotor 26 following onto the same, the rotors 26, 27 suck air from their bearing surface for the layer web 11, so that the latter is secured with said slip with respect to the rotors 26, 27. The thin-walled tubular rotor 26 has e.g. radial suction holes distributed in ring-like manner in the bottom faces of its guide slots and corresponding suction holes can traverse the upper wall of a suction box 29 located between the strands of the rotor 27 and the rotors 26, 28, said wall connecting approximately to the circumferences of the rotors 26, 28.

The rotors 27 are traversed by openings, which pass over the suction holes and consequently transfer the suction force to the layer web 11 in such a way that the latter is only carried along by the belts 27, but is freed from the suction force again at the deflecting means 28. The belts 27 can have larger intermediate spacings compared with their width, the widths or intermediate spacings being constant over the working width. In the running direction of the layer web 11 and directly after the deflecting means 28 can be connected a sliding face for the layer web 11, which extends approximately up to its cutting point, so that the layer web here, as through the suction box 29, is reliably supported and can be supplied under thrust forces to the cutting point or the transfer point 24.

A roller-like pressure member 31 with roughly the same diameter engages with a radial pressing action on the circumferential side of the rotor 25 facing the device 14 and is slightly closer to the support web 10, whose outer circumference is passed round upwards and back downwards over more than 180° by the layer web 11 and which in the vicinity of a passage gap, whose width is continuously adjustable, for the layer web 11 is supported on the circumference of the rotor 25. The latter is in turn passed round by the layer web 11 by an arc angle of approximately 180°. Correspondingly freely rotating, but separately mounted, roll-like pressure members 32 are also associated with the circumference of the rotor 26, the rotors 27 or the start of the straight path and for each belt 27 is provided a width-adapted, separate runner 32, which defines a corresponding, continuously adjustable running gap and has a roughly ⅓ smaller diameter than the rotors 25, 26, 31.

In the running direction 12 adjacent to the rotors 25 or 31 the layer web 11 is guided by means of a freely rotatable, roller-like guide member 33, from whose underside it passes directly to the pressure member 31 and from there upwards and back to the rotors 25, 26, 27, 28. Below the guide roller 33 the support web 10 provided with the layer parts 11' passes in contact-free manner out of the unit 2. The rotation axes or spindles of substantially all said rotors are located roughly parallel to one another and parallel to the planes of the webs 10, 11.

The transfer rotor 17 is constructed as a thin-walled, tubular hollow roller, in which control means are provided in order to be able to bring about a different holding or retaining force for the layer parts 11' in several sectors interconnecting over the circumference. To the inner circumference of the rotor 17 are circumferentially connected at least four and in particular five chambers 34 to 38 assuming roughly the same arc angles, which are separated from one another by a narrow, radial web-like separating member 39, which is guided with a ledge-like sealing member radially resiliently displaceable in its outer longitudinal edge and accompanied by pressing on the inner circumference of the rotor 17. The edge of the sealing face of the sealing member facing the particular chamber forms a control edge, which separates the chamber in pressure-tight manner from the adjacent chamber. The five separating members 39 are fixed in radially projecting manner to the circumference of a roller-like core 40, which in cross-section has in a ring around its axis a number of longitudinal holes corresponding to the number of channels and which are in each case connected by means of transverse holes to one of the associated chambers. These holes 41 or longitudinal holes are connected to separate fluid lines at an end of the core 40 remote from the drive side, so that each of the chambers, independently of the others, can be subjected to the desired fluid pressure vacuum. On the inside of the associated side wall the rotor 17 is mounted on the widened end collar of the core 40, which is mounted with its other end in an end flange of the rotor 17. The core 40 or the control edges can consequently be rotated continuously with respect to the frame 5, 6 and the points 20, 24 and can be fixed in each position, i.e. with a handle or servodrive provided at the connecting end of the core 40. The rotor 17 with the core 40 can be replaced independently of all the other rotors in order to be able to convert to different format areas by the choice of its circumference.

The jacket of the rotor 17 is traversed in a fine grid pattern over the circumference and its length and in uniform manner by radial holes, whose ends or openings located in the outer circumference are connected with the particular chamber passed over. For example holes with an approximately 2 mm diameter and approximately 8 mm axial spacing can be provided in alternately displaced manner in adjacent parallel rows, so that even the smallest layer parts 11' can be held. Of the chambers extending in each case over an arc angle between 60° and 90°, the chamber 34 in the vicinity of the transfer point 24 is appropriately subject to a vacuum, said chambers having a smaller extension than in the running direction from the transfer point 24 counter to the running direction of the rotor 17. The chambers 35, 36 connected in the running direction to the chamber 34 and extending approximately up to the placing on point 20 are also subject to the action of a vacuum, which can be higher than in the vicinity of the chamber 34, in order to secure the layer parts 11' in completely slip-free manner in this area. Roughly in the vicinity of the placing down point 20 or less than 10 radians counter to the running direction is provided the front control edge of the vacuum chamber 36, the chamber 37 connecting in the running direction having normal pressure or is subject to compressed air, so that in its vicinity the circumference of the rotor 17 repels rather than carries along the parts 10, 11'. Thus, the front end of the layer part 11' in the running direction is freed directly upstream of the setting down point 20 from the retaining force, but is still held by the portion located behind it in the vicinity of the chamber 36 and which is gradually released during the adhesive placing on the support web 10. By means of the regulatable chambers the pressure zones can be accurately adapted to the particular transfer sequence and the materials used. The chamber 38 located between the chambers 37 and 34 can be subject to atmospheric pressure.

For cleaning the circumferential surface of the rotor 17 cleaning means are provided, which in the running direction directly following the setting down point 20, have a brush roller 42 driven with a friction drive, e g. the circumference of the rotor 17. The brush roller rotates with relative speed on the outer circumference of the rotor 17 and siliconized air blown out of it radially can be blown against this circumference in order to prevent deposits on the rotor 17.

Through the guide roller 19 the support web 10 is not supplied at right angles to the passage gap of the common axial plane of the rotors 17, 18 and is instead supplied under a few radians to the circumference of the counterrotor 18, so that it is ensured that only at the narrowest point of the passage gap 20 is there a reciprocal contact between the support web 10 and the layer part 11'.

For modifying the gap width only the counterrotor 18 is movably mounted in radial manner with respect to the frame 5, 6 with a control or adjusting device 43 having as the drive a fluid cylinder. The pivot bearing of the rotor 18 can be received in an eccentric bearing, whose pivoting movements lead to the said adjustment. In its position closest to the rotor 17, the rotor 18 is limited by a continuously adjustable stop 44, e.g. an eccentric stop, which can be adjusted with a handle from the outside of the associated wall 5. Therefore the passage gap or dispensing channel can be accurately adapted to the material thicknesses of the support web and layer material 11, 11'. With a correspondingly constructed eccentric bearing, adjusting device 45 and stop 46 it is possible to radially adjust or set with respect to the rotor 17 and with the indicating effects the rotor 21. The drives of the adjusting devices 43, 45 are appropriately positioned roughly horizontally on the side of the associated rotor 18 or 21 remote from the rotor 17. The rotor 31 is also adjustable against a continuously settable stop 48 by a corresponding adjusting device 47, the raising of the rotors 28, 21, 31 from the associated rotor 17, 25 significantly facilitating the insertion of the material webs in the unit 2.

To the inner circumference of the rotor 26 is connected a chamber 50 bounding the holding circumference 30 and which much in the same way as for the rotor 17 is formed by a core with separating members and a connecting hole with respect to which the rotor 26 rotates in operation. In the vicinity of the free path between the rotors 25, 26 the support web 11 can be worked, e.g. provided with a hot glue application by an applicator 51. Each of the rolls 32 is continuously transversely adjustable with respect to the rotor 26 or 27, independently of the others, with an adjusting device 52. Each roll 32 is transversely adjustable in continuous manner on a rail parallel to its axis with respect to the frame 5, 6 and is guided in fixable manner by clamping. Over most of its circumferential area surrounded by the layer web 11, the rotor 31 is covered by a guide member 53 roughly parallel thereto and through which on threading the layer web 11 can be moved by the rotor 31 up to the transfer to the rotor 25. The glue application by the device 41 appropriately takes place at the point where the rolls 32 also run, but transferred into glue-free zones opposite the glue zones. The rotors 25, 26, 27 can be thermostatically controlled, e.g. can be cooled to avoid excessive temperatures through the glue application, e g. by circumferential cooling in the chambers or suction boxes.

Substantially all the driven rotors are driven from the same frame side, namely the outside of the wall 5. The driven pinion 55 of the superimposing gear 54 located on the outside of the associated frame wall 7 drives in slip-free manner by means of a single-stage belt drive 56 the rotor 17. By means of a gear stage 57 formed by a steel/plastic gear wheel pair, the drive 56 directly drives the rotor 18. The gear 54 is driven by means of a main shaft driving several working units of the machine and by the superimposing gear 54 a slip compensation is possible by the choice of a permanent superimposing. The device 15 or the rotor 21 is driven by a drive 58 rotation position-controllable by acceleration and deceleration and located directly in the axis and which is radially adjustable with the rotor 21. By a corresponding drive 59 is also driven the feed 16 or rotor 25, so that as a result the drive of the rotors 26, 27, 31 takes place. All the drives are controllable or regulatable independently of one another in this way. They are controlled by pressure marks on the webs 10, 11, on the basis of their detection the layer parts 11' and support web 10 are brought together in a precise manner. If the layer web 11 is to be applied continuously to the support web 10 without sub-division into individual layer parts, then the feed 16 runs synchronously to the rotor 17 or the support web 10 and the rotor 21 is raised from the rotor 17 either by the adjusting device 45 or is transferred into a rotation position such that the bead is located outside the passage gap 24 and consequently as a result thereof a free passage of the layer web 11 is possible.

In order to be able to positively and negatively accelerate with limited inertias the rotor 21, it is driven without intermediate gears or its core 60 is essentially made from glass fibre-reinforced plastic in which also the knife 22 engages. The core is traversed by hollow chambers 21, e.g. longitudinal holes, which are located in a ring around and/or in its axis and both in the vicinity of the knife 22 and diametrically facing the same no hollow chambers are provided, so that in simple manner there is an inertia counterweight to the knife 22 directly provided by the core 60. The circumference can be formed by the core 60 or a separate jacket. As described relative to the rotor 17, the circumference of the rotor 21 is also cleaned with a cleaning device, e g. a brush roller 62 and here again siliconized air can be supplied. The brush roller 62 is driven by the rotor 21 and in opposite running direction thereto by means of a belt drive. If a one-sided glued layer web 11 or layer parts 11' glued in this way are supplied, then the associated support surfaces of the feed 16 formed by the rotors are appropriately coated with a non-stick material.

For applying the layer parts 11' to the support web 10 the latter are continuously moved through the passage gap 20, the circumferential speed of the rotor 17 being synchronous to the running speed of the support web 10, so that in the setting down point 20 relative speeds cannot lead to setting down tolerances. The layer web 11 passes through the feed 16 in the described manner, arrives with its front end in the passage gap 24, is slightly raised in the vicinity of the chamber 34 with a possibility of slip from the continuously rotating circumference of the rotor 17 and then a layer part 11' is separated by means of a knife 22 running in the same direction as the circumference of the rotor 17 and at the same time the layer part 11' is applied in substantially slip-free, firm manner to the circumference of the rotor 17. This layer part 11' is then carried along by the rotor 17 from the transfer point 24 over more than 180° initially counter to the running direction 12 and then downwards over the areas of the chambers 35, 36, in which the holding force of the rotor 17 by a correspondingly high vacuum is sufficiently strong to prevent any relative movement of the layer part 11' compared with the rotor 17.

In the vicinity of the setting down point 20 the layer part 11' runs in essentially the same direction as the support web 10 and passes into the vicinity of the chamber 37, i.e. is detached from the rotor 17 and applied to the associated side of the support web 10. As a result of the positioning of the layer part 11' on the rotor 17, its positioning on the support web 10 is also defined, the rotor 17 permitting a slip-free transfer to the web 10. Any slip occurring in the vicinity of the transfer point 24 is then compensated in the described manner by the rotation superimposing acting on the rotor 17. The format of the parts 11' and the format fields of the support web 10 can be modified independently of one another, as can the number of layer parts successively separated from the web and to be successively applied in the running direction 12 for each format field, because the rotor 21 is accelerated independently of the support web 10 and can therefore be driven in any random transmission ratio relative thereto. Through the control of the rotor 21 even very small layer parts 11' can be transferred in such a way that they completely cover at least two suction openings of the rotor 17.

In the embodiment of FIG. 4 the not shown layer web 11 is guided in upwardly inclined manner by the guide member 13 over the circumference of the pressure member 31 and from the latter with a S-shaped deflection over an arc angle of approximately 270° over the circumference of the rotor 25. From the top of the latter the layer web passes over a guide member 63, e.g. a table, which in the same way as the guide member according to FIG. 1 extends roughly up to the cutting edge of the counter-knife 23, so that in this way there is no need for a belt section.

We claim:

1. An apparatus for working material including at least one material base and at least one accessory material, said working including applying at least one of said accessory material to at least one of said material base, said apparatus comprising:

a stationary, apparatus;

a plurality of working cursors including a conveyor having a feed runner for feeding the at least one accessory material, a positioning runner for positioning the at least one accessory material, and a transfer runner for directly transferring the at least one accessory material on the at least one material base at a transfer point, and drive means for driving said working cursors at relative speeds, said drive means including a feed drive for driving said feed runner, a positioning drive for driving said positioning runner, and a transfer drive for driving said transfer runner in working operation of said apparatus, wherein control means are provided for driving at least one of said working cursors independent from the material base.

2. The apparatus according to claim 1, wherein said drive means include separate drive motors for driving at least two of said working cursors, at least one of said drive motors being coaxial with at least one of said working cursors.

3. The apparatus according to claim 1, wherein said drive means include first and second asynchronous motors for driving said feed runner and said positioning runner at least one of said asynchronous motor being vectorially controlled, said first asynchronous motor being coaxial with said positioning runner and said second asynchronous motor being coaxial with said feed runner.

4. An apparatus for working material including at least one material base and at least one accessory material, said working including applying at least one of said accessory material to at least one of said material base, said apparatus comprising: an apparatus base; a plurality of working cursors including a conveyor having a feed runner for feeding the at least one accessory material, a positioning runner for positioning the at least one accessory material, and a transfer runner for transferring the at least one accessory material on the at least one material base, and drive means for driving said working cursors at relative speeds, said drive means including a feed drive for driving said feed runner, a positioning drive for driving said positioning runner, and a transfer drive for driving said transfer runner in working operation of said apparatus, wherein control means are provided for driving at least two of said working cursors at dynamically variable relative speeds while said apparatus is performing said working operation;

said drive means including a positively driveable interference gear unit providing a drive input and a drive output for driving said transfer runner, running speeds of said drive output being continuously variable without varying a running speed of said drive input.

5. The apparatus according to claim 4 and including a base support supporting a working unit including said apparatus base and at least one of said working cursors, said interference gear being mounted on said base support, an intermediate drive being provided for drive connecting said interference gear with said working unit, means being provided for removing said working unit from said base support without destruction.

6. The apparatus according to claim 1, wherein said drive means include at least one motor located in a rotation axis of at least one of said working cursors, said motor directly driving said working cursor without intermediate gear mans at dynamically variable speeds and transmission ratios with respect to the material base.

7. The apparatus according to claim 1, wherein said positioning runner includes means for severing and unmatching the at least one accessory material from a material web, at a distance from said transfer runner, commonly with said transfer runner said positioning runner bounding a working gap and directly opposingly supporting the accessory material within said working gap.

8. The apparatus according to claim 1, wherein said positioning runner is provided for directly and individually transferring at least one of the accessory material on said transfer runner, said positioning runner and said transfer runner commonly bounding a transfer gap including a transfer point at which the accessory material begins to connect to said transfer runner, means being provided for repeatedly narrowing and widening said transfer gap, said means including a repeatedly returning protrusion narrowing said transfer gap.

9. The apparatus for working material including at least one material base and at least one accessory material, said working including applying at least one of said accessory material to at least one of said material base, said apparatus comprising:

an apparatus base;
a plurality of working cursors including a conveyor having a feed runner for feeding the at least one accessory material, a positioning runner for positioning the at least one accessory material, and a transfer runner for transferring the at lest one accessory material on the at least one material base, and
drive means for driving said working cursors at relative speeds, said drive means including a feed drive for driving said feed runner, a positioning drive for driving said positioning runner, and a transfer drive for driving said transfer runner in working operation of said apparatus, wherein control means are provided for driving at least two of said working cursors at dynamically variable relative speed while said apparatus is performing said working operation positioning runner including a cutting rotor having a severing knife, said severing knife being provided for operationally rotating in substantially only one severing direction and for severingly cooperating with a counterknife.

10. The apparatus according to claim 1, wherein a passage gap is commonly bound by said positioning runner and said transfer runner, said passage gap defining an intermittently operating clamping means for pressing the accessory material against said transfer runner while simultaneously separating the accessory material from a material web upstream of said passage gap said passage gap being provided for feedingly advancing material web in a feed motion with respect to both said positioning runner and said transfer runner prior to individually separating the accessory material from the material web, said drive means being provided for driving said clamping means at speeds dynamically varying while the material web is transferred through said passage gap.

11. The apparatus according to claim 1, wherein said positioning runner is at least partly made in lightweight construction having a specific volume weight substantially lower when compared with solid steel material, said positioning drive including a drive motor oriented coaxial with said positioning runner and directly driving said positioning runner.

12. The apparatus according to claim 7, wherein said positioning runner defines a length extension cross-sections transverse to said length extensions, for mass-reducing said positioning runner over said length extension said cross-sections including fibre-reinforced nonmetallic material, said material including entirely embedded fibers.

13. The apparatus according to claim 1, wherein said positioning runner is internally provided with cavities at least partly covered peripherically of said positioning runner, a cross-cutting knife for severing the accessory material engaging between said cavities.

14. The apparatus according to claim 1, wherein said transfer runner defines circumferentially directly juxtaposed runner zones including an uppermost top zone and a reception gap for closely receiving the at least one accessory material while separating the accessory material from a strand material, said positioning runner engaging said transfer runner at said reception gap located upstream of said uppermost zones.

15. The apparatus according to claim 1, wherein said transfer runner has a transfer circumference including sucking means and defining a take over gap for closely receiving the accessory material, said transfer circumference defining circumferential extension and said transfer point for delivering the accessory material to the material base at circumferential distance from said take over gap of more than half said circumferential extension, said sucking means being controlled by separate suction chambers distributed along said circumferential distance, said transfer point being bounded by a transfer gap conveyingly traversed by the material base, said transfer gap being continuously widenable and narrowable without displacing said transfer runner with respect to said positioning runner.

16. The apparatus according to claim 15, wherein said transfer runner defines a main transfer axis, said suction chambers including juxtaposed chambers reciprocally separated by control separators, with respect to said transfer runner and said apparatus base at least one of said control separators being continuously adjustable about said transfer axis for circumferentially displacing and stationarily holding at least one of said section chambers with respect to said apparatus base independent from rotation of said transfer runner about said transfer axis.

17. The apparatus according to claim 16, wherein a stellated control body is provided inside said transfer runner, said control body including a shaft hub and a plurality of said juxtaposed control separators bounding a plurality of said suction chambers, and sealing sliding on an inner control circumference of said transfer runner, said control body providing a plurality of reciprocally sealingly separated and separately controllable pressure control ducts separately issuing into at least two of said suction chambers, said control circumference being traversed by suction ducts circumferentially and axially distributed over at least one of said suction chambers.

18. The apparatus according to claim 1, wherein said conveyor includes a feed drive and a tensioning conveyor for longitudinally tensioning the accessory material downstream of said feed drive and upstream of said transfer point while simultaneously conveying the accessory material, said tensioning conveyor being located between said feed drive and said positioning runner and said transfer runner, said tensioning conveyor including a conveyor belt separate from said transfer runner and passing over at least one vacuum chamber, said vacuum chamber being continuously displaceable alone said conveyor belt and with respect to said apparatus base independent from driving said conveyor belt.

19. The apparatus according to claim 18, wherein said at least one vacuum chamber includes a first vacuum chamber and a second vacuum chamber located downstream of said first vacuum chamber, said feed drive including an operationally rotating deflection rotor for circumferentially deflecting said conveyor belt, said deflection rotor internally bounding said first vacuum chamber.

20. The apparatus according to claim 1, wherein said transfer runner and said positioning runner commonly bound a passage cap closely traversed by the accessory material and directly following said tensioning conveyor for taking over the accessory material, for tensioning the accessory material said conveyor including a tensioning conveyor including a linear slide support for slidingly supporting the accessory material up to close to said passage gap, between said slide support and said passage gap a severing tool being provided for severing.

21. The apparatus according to claim 1, wherein a counter runner is provided for bounding a transfer gap commonly with said transfer runner at said transfer point, drive means being provided for widening and narrowing said transfer gap exclusively by displacing said counter runner, abutting means being provided for stop limiting said narrowing against drive of said drive means.

22. The apparatus according to claim 1, wherein from an entrance to an exit of said apparatus the material base enters and leaves said apparatus in a general running direction, means being provided for supplying the accessory material at said exit substantially parallel, directly juxtaposed and counter to said running direction to said conveyor, with respect to said running direction said conveyor being substantially entirely located between said transfer point and said exit.

23. The apparatus according to claim 1, wherein said conveyor includes a slide support for directly supporting the accessory material, said feed runner including a drive runner located upstream of said slide support, said slide support issuing at said positioning runner for directly supplying the accessory material onto said positioning runner, said transfer runner, and a counter tool for unmatching the accessory material, said counter tool being inserted into said slide support and cooperating with a severing tool inserted into said positioning runner, said slide support being substantially planar up to said counter tool.

24. The apparatus according to claim 1, wherein a plurality of passage gaps including a transfer gap and a positioning gap is provided for guiding the material base and the accessory material, said transfer gap being bounded by said transfer runner and a counter runner, said positioning gap being bounded by said transfer runner and said positioning runner, both said transfer gap and said positioning gap being individually continuously widenable and narrowable without displacing said transfer runner with respect to said apparatus base, drive means being provided for displacing said counter runner and said positioning runner transverse to said transfer runner.

25. The apparatus according to claim 24, wherein at least one of said counter runner and said positioning number is rotationally mounted with rotation bearing defining a rotation axis, said rotation bearing being adjustably mounted to said apparatus base about an adjustment axis located eccentrically with respect to said rotation axis of said rotation bearing, at least one continuously adjustable stop being provided for adjusting an operational width of at least one of said passage gaps, said drive means driving said rotation bearing around said adjustment axis.

26. The apparatus according to claim 1, wherein means are provided for simultaneously applying the accessory material in a plurality of separately juxtaposed accessory units to laterally juxtaposed zones of the material base, the accessory material being supplied counter to and directly juxtaposed with the material base, said conveyor deflecting the accessory material from directly juxtaposed with the material base away from and back towards the material base and then back onto said transfer runner.

27. The apparatus according to claim 1, wherein setting means are provided for alternately operating said apparatus in first and second operating modes, said first operating mode being provided for applying the accessory material in continuously spacedly following accessory units to the material base, said second operating mode being provided for combining the accessory material and the material base to a continuous multilayer web substantially continuously including the accessory material over a length extension multiply longer than in the first operating mode, said setting means being provided for commonly displacing a cutting tool and said positioning runner into a position away from said transfer runner and away from the accessory material.

28. The apparatus according to claim 1, wherein said transfer runner includes an areally spread sucking perforation for directly adhering the accessory material, said control means being provided for rotationally positioning said sucking perforation by acceleration with respect to the accessory material prior t positionally rigidly securing the accessory material on said transfer runner.

29. The apparatus according to claim 1, wherein said apparatus base includes a base frame, said base frame providing a stiffening crossmember connecting two opposing bearing cheeks in a lowermost bottom zone, said bearing cheeks being provided for mounting at least one of said working cursors, said base frame providing a trolley for supportingly engaging said apparatus on a top side of a base support, said trolley defining a trolley motion oriented transverse to an operational running motion of the material base, a drive connection being provided for connecting said transfer runner with a drive gear of said control means, said drive connection being a belt drive.

30. An apparatus for working material including a material base and accessory material, said working including attaching the accessory material on the material base in a continuous working motion, said apparatus comprising:

an apparatus base;

an accessory conveyor for substantially continuously feeding the accessory material towards the material base at a feeding speed;

a base conveyor for conveying the material base towards the accessory material at a conveying speed, and drive means for positively driving said accessory conveyor and said base conveyor with motor power, a relative towarding speed being defined as a speed relation between said feeding speed and said conveying speed, wherein control means are provided for continuously varying said towarding speed while simultaneously the working material (10, 11) performs said continuous working motion and is tensioned parallel to said working motion.

* * * * *

UNITED STATES PATENT AND TRADEMARK OFFICE
CERTIFICATE OF CORRECTION

PATENT NO. : 5,766,406
DATED : June 16, 1998
INVENTOR(S) : Bohn, et al.

It is certified that error appears in the above-indentified patent and that said Letters Patent is hereby corrected as shown below:

Claim 6 (line 23): Delete "mans" and insert therefor --means--.

Claim 13 (line 30): Delete "peripherically" and insert therefor --peripherally--.

Signed and Sealed this

Sixteenth Day of March, 1999

Attest:

Q. TODD DICKINSON

*Attesting Officer*  *Acting Commissioner of Patents and Trademarks*

(12) EX PARTE REEXAMINATION CERTIFICATE (8085th)
United States Patent
Bohn et al.

(10) Number: US 5,766,406 C1
(45) Certificate Issued: Mar. 15, 2011

(54) APPARATUS FOR WORKING LAYER MATERIAL

(75) Inventors: Martin Bohn, Reutlingen (DE); Wolfgang Scheller, Oberpleichfeld (DE); Klaus Hoerz, Neuffen (DE)

(73) Assignee: Bielomatik Leuze GmbH & Co., Neuffen (DE)

Reexamination Request:
No. 90/009,300, Oct. 7, 2008

Reexamination Certificate for:
Patent No.: 5,766,406
Issued: Jun. 16, 1998
Appl. No.: 08/498,296
Filed: Jul. 3, 1995

Certificate of Correction issued Mar. 16, 1999.

(51) Int. Cl.
*B65H 39/00* (2006.01)
*B65H 39/14* (2006.01)

(52) U.S. Cl. .................. 156/362; 156/517; 156/521; 156/556

(58) Field of Classification Search .................. None
See application file for complete search history.

(56) References Cited

U.S. PATENT DOCUMENTS

| | | | | |
|---|---|---|---|---|
| 2,990,081 A | * | 6/1961 | De Neui et al. | 156/519 |
| 4,642,085 A | * | 2/1987 | Helm | 493/222 |
| 4,795,510 A | * | 1/1989 | Wittrock et al. | 156/64 |
| 5,078,375 A | * | 1/1992 | Steidinger | 270/52.09 |
| 5,129,568 A | * | 7/1992 | Fokos et al. | 226/27 |
| 5,235,515 A | * | 8/1993 | Ungpiyakul et al. | 700/125 |
| 5,380,381 A | * | 1/1995 | Otruba | 156/64 |
| 5,413,651 A | * | 5/1995 | Otruba | 156/64 |

OTHER PUBLICATIONS

Product Guide for Ormec "Generation III" Multiple Axis computer–based servo motor controller (1992).*

* cited by examiner

*Primary Examiner* — Terrence R Till

(57) ABSTRACT

An apparatus for applying dispensing parts to a support web has a transfer device running synchronously with the web for applying the dispensing parts, a positioning device for the correct position separation and transfer of the dispensing parts to the transfer device and a feed device for supplying a dispensing web to the positioning device. The three devices are independently controllable with respect to their working speeds, so that by speed superimposing any random number of dispensing parts of random size and in random positions can be transferred to the support web.

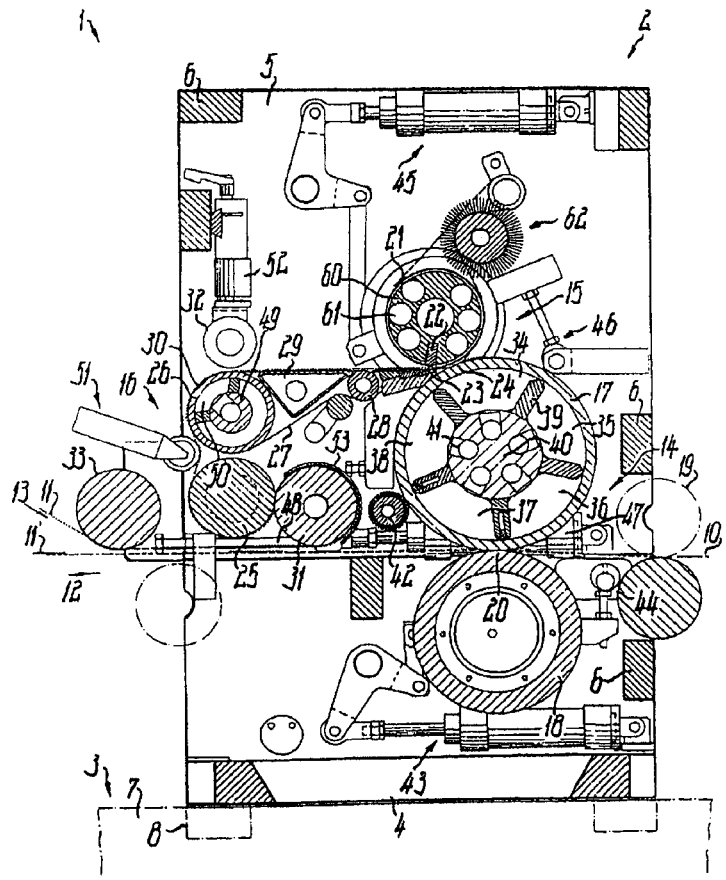

EX PARTE REEXAMINATION CERTIFICATE ISSUED UNDER 35 U.S.C. 307

Figure 1:
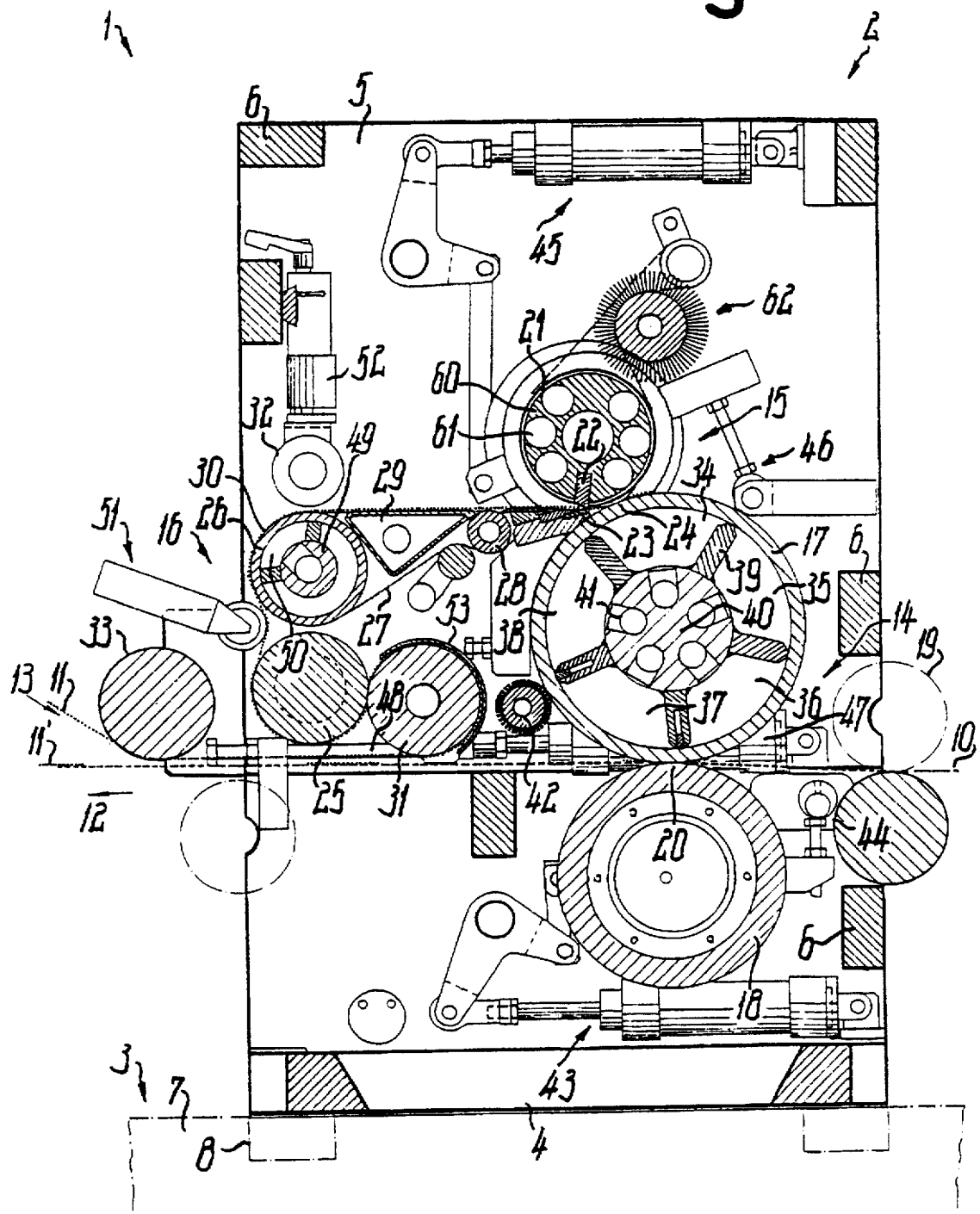
Figure 2:
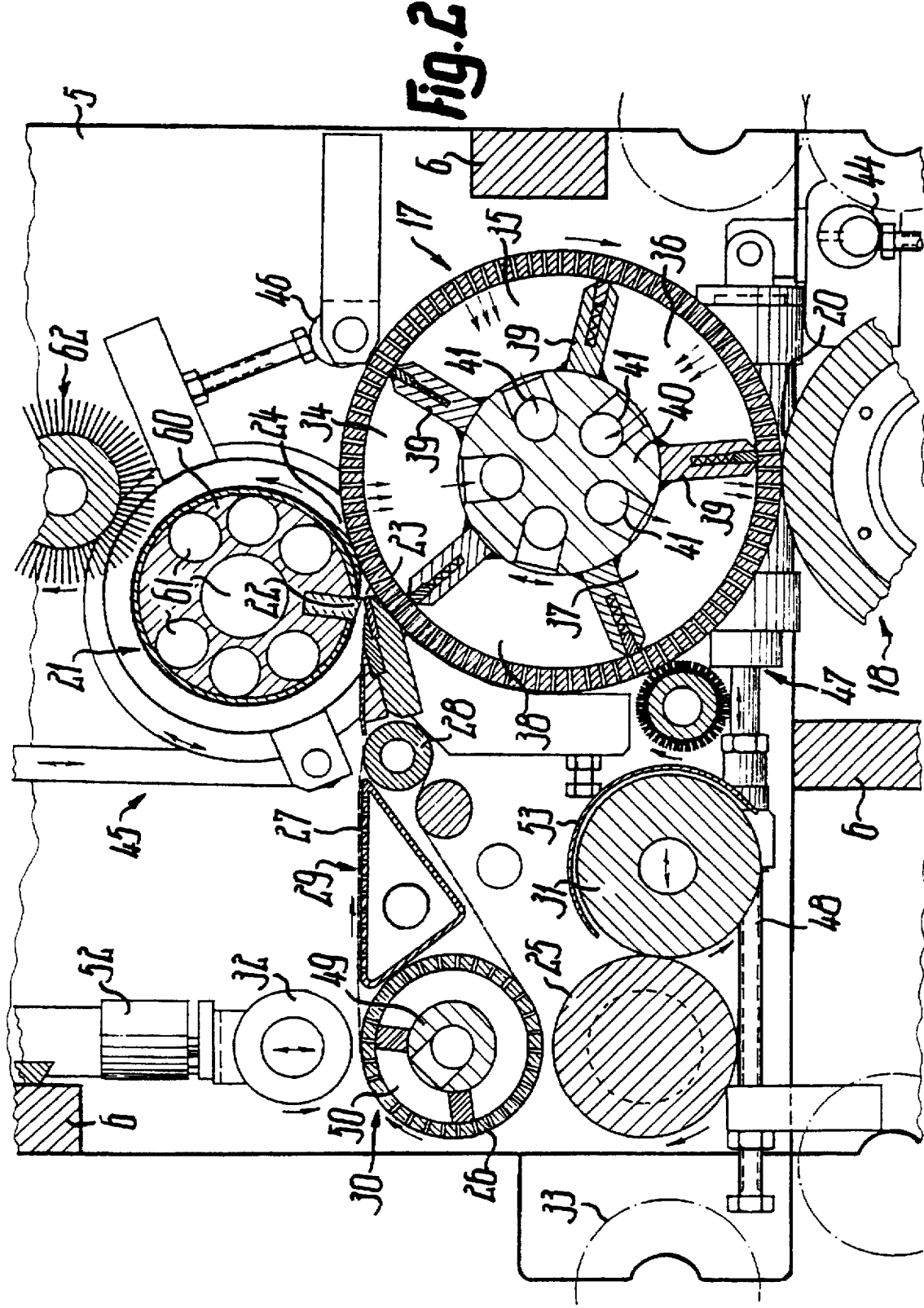
Figure 3:
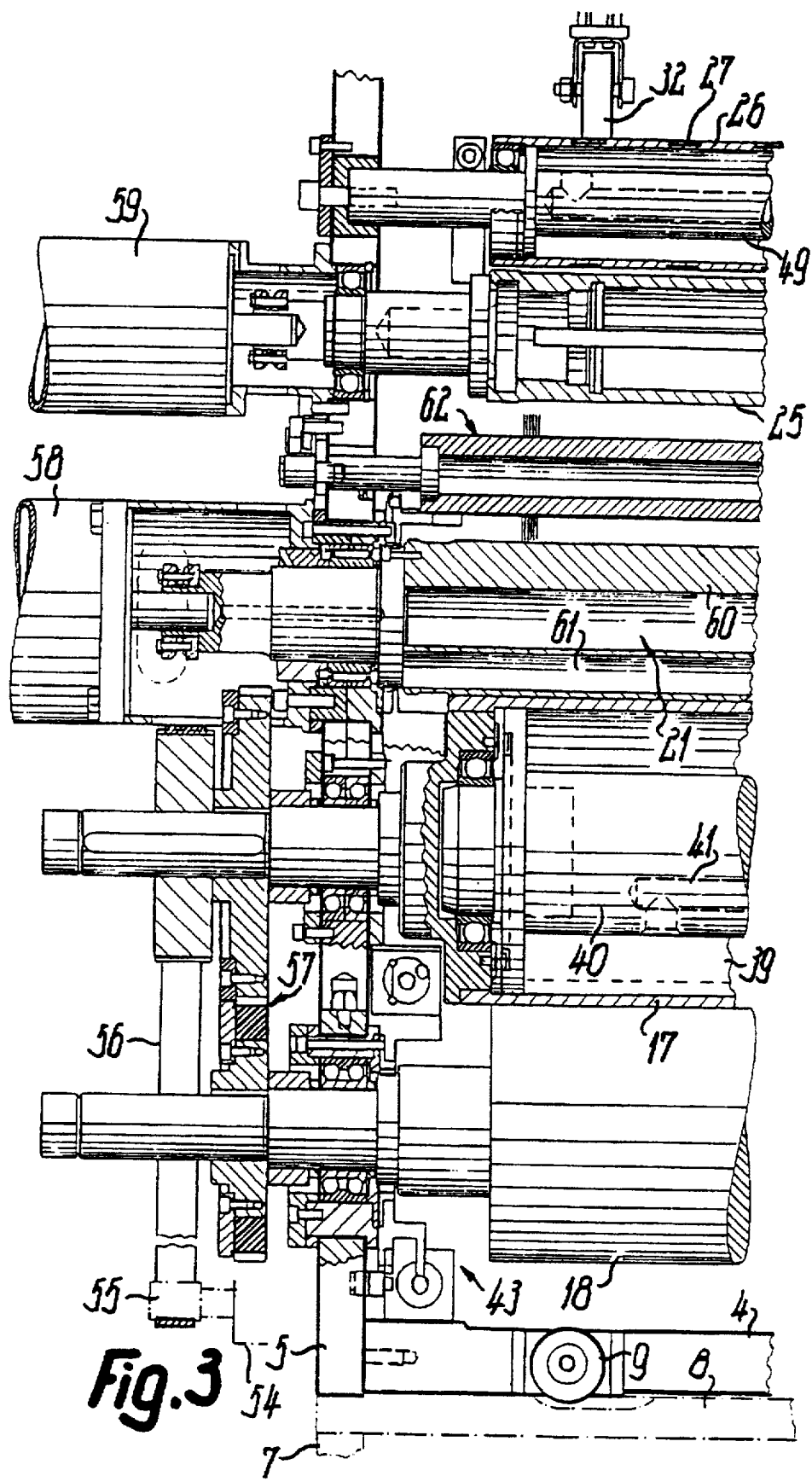
Figure 4:
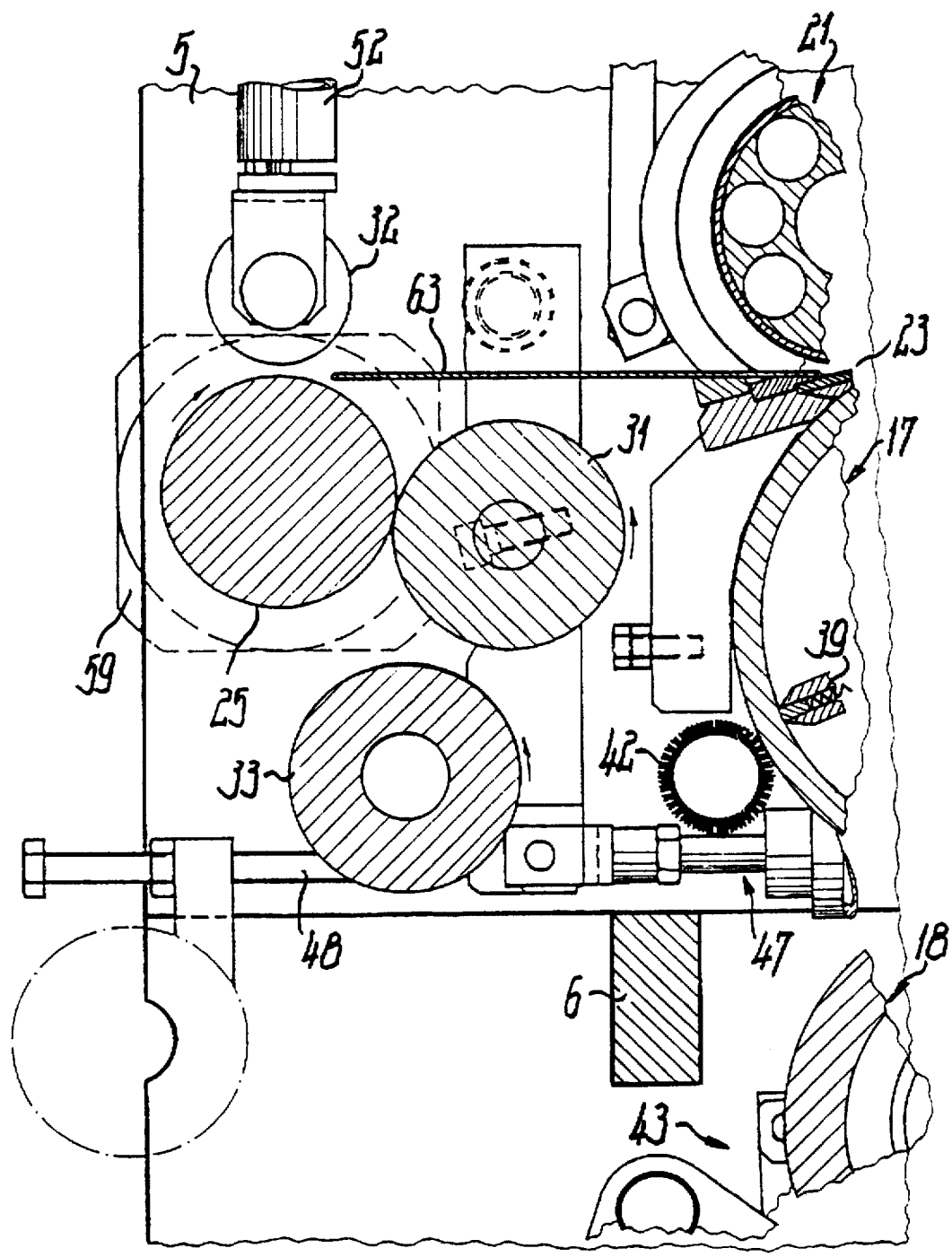

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 2, 4-6, 9, 15, 18, 20-22 and 24 is confirmed.

Claim 30 is determined to be patentable as amended.

New claims 31 and 32 are added and determined to be patentable.

Claims 3, 7, 8, 10-14, 16, 17, 19, 23 and 25-29 were not reexamined.

30. An apparatus for working material including a material base and accessory material, said working including attaching the accessory material on the material base in a continuous working motion, said apparatus comprising:

an apparatus base;

an accessory conveyor for substantially continuously feeding the accessory material towards the material base at a feeding speed;

a base conveyor for conveying the material base towards the accessory material at a conveying speed[, and];

[drive means] *a first drive* for positively driving said accessory conveyor; *and*

*a second drive for driving* said base conveyor with motor power, *the first drive and the second drive being independently controllable,* wherein a relative towarding speed [being] *is* defined as a speed relation between said feeding speed and said conveying speed, *and* wherein control means are provided for continuously varying said towarding speed while simultaneously the working material [(10, 11)] performs said continuous working motion and is tensioned parallel to said working motion.

*31. The apparatus according to claim 30, wherein a rotational speed of the first drive is independently variable with respect to a rotational speed of the second drive.*

*32. The apparatus according to claim 30, wherein the first drive and/or the second drive is a vector-regulated asynchronous motor.*

\* \* \* \* \*